US006837081B2

(12) United States Patent
Ruano Aramburu et al.

(10) Patent No.: US 6,837,081 B2
(45) Date of Patent: Jan. 4, 2005

(54) CLUTCH MECHANISM FOR LOCKS

(75) Inventors: Luis Angel Ruano Aramburu, Guipuzcoa (ES); Fermin Menta Sanmiguel, Guipuzcoa (ES)

(73) Assignee: Talleres De Escoriaza, S.A. (ES)

( * ) Notice: Subject to any disclaimer, the term of this patent is extended or adjusted under 35 U.S.C. 154(b) by 91 days.

(21) Appl. No.: 10/277,600

(22) Filed: Oct. 22, 2002

(65) Prior Publication Data

US 2003/0084690 A1 May 8, 2003

(30) Foreign Application Priority Data

Nov. 8, 2001 (ES) .......................................... 200102469

(51) Int. Cl.[7] ........................... E05B 13/10; G05G 5/00; F16C 3/00

(52) U.S. Cl. ............................. 70/218; 70/222; 70/189

(58) Field of Search .......................... 70/218, 188, 189, 70/222, 223

(56) References Cited

U.S. PATENT DOCUMENTS 4,429,556 A * 2/1984 Kambic ........................ 70/149
4,995,248 A * 2/1991 Liu ............................. 70/107
5,027,629 A * 7/1991 Liu ............................. 70/277
5,475,996 A * 12/1995 Chen ......................... 70/279.1
5,640,863 A * 6/1997 Frolov ......................... 70/283
5,735,151 A * 4/1998 Nickeas et al. ............... 70/221
5,813,261 A * 9/1998 Boehlow .................. 70/379 R
5,953,942 A * 9/1999 Doucet et al. ................ 70/283
5,987,945 A * 11/1999 Ruano Aramburu ......... 70/277
5,992,191 A * 11/1999 Nickeas et al. ............... 70/218
6,286,347 B1 * 9/2001 Frolov ......................... 70/472
6,363,762 B1 * 4/2002 Kueng ....................... 70/278.3
6,651,468 B2 * 11/2003 Aramburu et al. ............ 70/222
2002/0139156 A1 * 10/2002 Aramburu et al. ............ 70/218

* cited by examiner

*Primary Examiner*—John B. Walsh
(74) *Attorney, Agent, or Firm*—Nields & Lemark

(57) ABSTRACT

Clutch mechanism for locks, which is composed of an interior axis (1), an exterior axis (2), a static body (3), a radial pin (4), a radial catch (5) and a radial actuator (6); said interior (1) and exterior (2) axes and body (3) compose a coaxial assembly where the exterior axis (2) penetrates the interior axis (1) and both are installed with a rotational adjustment in the static body (3), the set of radial pin (4) and radial catch (5) is installed between the actuator (6) and a radial spring (7) which acts between the catch (5) and the base of the housing (2*a*) of the exterior axis (2); whose pin (4) and catch (5) are dimensioned in such a way that each will be able to be moved between the circumferences of the exterior diameter of the axis (2) and the interior diameter of the axis (1); the radial actuator (6) is composed of a curved plate (6*a*) and by, at least, one rod (6*b*), whose plate (6*a*) is located in an annular depression (8) between the interior axis (1) and static body (3), extending in a circumferential arc containing the angular sector corresponding to the operative rotational transit of the interior axis (1).

6 Claims, 7 Drawing Sheets

CLUTCH MECHANISM FOR LOCKS

FIELD OF THE INVENTION

The present invention refers to a clutch mechanism which has the objective of facilitating the selective rotational coupling between primary and secondary axes, so that it can be determined as desired that one of them, for example the primary axis, may or may not be rotationally pulled by the turning of the other axis, for example the secondary axis.

This mechanism is specially designed for locks, and deals with those of the mechanical as well as the electromechanical type.

In the following, we consider that the primary axis is the one which is on the inside of the lock and is designated the "interior axis", and that the secondary axis is the one which is on the outside of the lock and is designated the "exterior axis".

BACKGROUND OF THE INVENTION

A characteristic feature of the manufacture of locks is that they respond to highly individualized designs including those created by a single manufacturer. This means that each lock responds to an exclusive design which uses pieces which are only applicable to itself and are not interchangeable with pieces of other locks, even though their function may be identical. It also means that when one wishes to incorporate some improvement in the features of a lock, instead of creating a new original design, it is typical to resort to modifications based on the original individual design; in this way, the result in turn becomes something which is only applicable to that specific lock and not to others.

This situation, which occurs when one wishes to satisfy new needs applying conventional mechanical technology, is also the case when trying to incorporate the more modern electronic technology.

The result is the production of executions which are complex in the configuration, number and assembly of the pieces and which are only valid in themselves. In order to better appreciate the gravity of this situation, think of the great variety of existing types of locks (with exterior and/or interior activation using a knob or handle, a conventional key and a knob or handle, or electromechanical mechanisms with a knob, handle or cylinder, etc.).

SUMMARY OF THE INVENTION

In response to this situation, this invention proposes a clutch mechanism of compact design which is designed under the essential premise of fulfilling its function of selectively producing the rotational coupling between two axes, independently of whether they belong to a mechanical or electromechanical lock as well as independently of whether these locks have interior and/or exterior knobs or handles.

According to the invention, this clutch mechanism is composed of an interior axis, and an exterior axis, a static body, a set of radial pin and radial catch, and a radial actuator; in which: said interior axis, exterior axis and static body compose a coaxial assembly in which the exterior axis penetrates with a rotational adjustment within the interior axis when both the interior and exterior axes are installed with a rotational adjustment in the static body, said set of radial pin and radial catch is installed with a movable adjustment between one said actuator which is in contact with the radial pin and a radial compression spring which acts between the radial catch and the base of a housing of the exterior axis, whose radial pin and radial catch are dimensioned in combination so that, in an exclusive manner, one or the other is able to remain placed between the circumference of the exterior diameter of the exterior axis and the circumference of the interior diameter of the interior axis, and said radial actuator is composed of a curved plate and of at least one rod, whose curved plate is located in an annular depression defined between said interior axis and static body, where this curved plate extends in a circumferential arc containing the angular sector corresponding to the operative rotational transit of said interior axis to either side of a central position, and whose rod of the radial actuator is installed with a movable adjustment in said static body and, when it is the only one, this rod is in the center of said curved plate and aligned with said radial pin and radial catch in said resting position.

This proposed constitution offers a simple function which is consistent in that with the radial actuator not activated (disengaged state), the contact between the pin and the catch is produced exactly at the edge plane of the rotational coupling between the interior and exterior axes, while the pin is held against the center of the concavity of the curved plate of said radial actuator; this means that both axes can turn independently of each other and that, therefore, if we connect only the interior axis to the mechanism belonging to the lock, the door will be able to be opened from the inside and not from the outside.

However, with the radial actuator activated (engaged state), the pin or the catch remains held in said edge plane of rotational coupling between the interior and exterior axes, which is produced by means of the elastic retraction or extension of the catch against its compression spring within its housing; this means that that door can be opened from the inside as well as from the outside, because the radial actuator has been displaced beforehand by mechanical or electromechanical means.

In any of the states described, during the entire operative transit of the interior axis in one or the other direction, the pin moves supported permanently on the curved plate of the radial actuator, which provides a smooth and reliable function.

According to another characteristic of the invention, there is a movable activator which is installed through the static body and which, in relation to the rotational position of rest of said interior axis, this movable activator is placed between a point, which in the exterior of the static body is in contact with the actuator lever of an electric micro-switch in an operative position of the same, and a rounded head which rests against the base of a recess which is made in the interior axis with lateral walls sloping divergently until they reach a peripheral annular track of the same interior axis, whose recess has a depth equivalent to the operative transit of said actuator lever of the micro-switch, and whose rounded head of the movable actuator has its back placed against one end of a spiral compression spring which has its other end placed against the static body.

This structure ensures that the turning of the interior axis from its resting position causes the movable actuator to be pushed toward the outside of the static body producing the activation of the micro-switch from which will result an electrical signal which reflects the position of this movable activator and which, as a function of this, can be used for functions complementary to the locking system or to the clutch itself. In addition, the housing itself of the head of the movable activator in the recess of the interior axis helps to mark a position which facilitates assembly and favors the precise adoption of the resting state in which the change between the disengaged and engaged states of the proposed mechanism must take place.

Another particular feature of the invention is that said static body incorporates a pair of small plates which are parallel to the operative displacement of said curved plate of the radial actuator and which more than cover the amplitude of this displacement, and which are each placed against one end of said curved plate. This device cooperates in the correct operational guidance of the radial actuator, and thus constitutes an additional resistant element of the ends of the curved plate when the pin is displaced over the same.

BRIEF DESCRIPTION OF THE DRAWINGS

To better understand the nature of the present invention, in the attached drawings we present some preferred forms of industrial embodiment, which have the character of a simply illustrative and non-limiting example.

Figure 1:
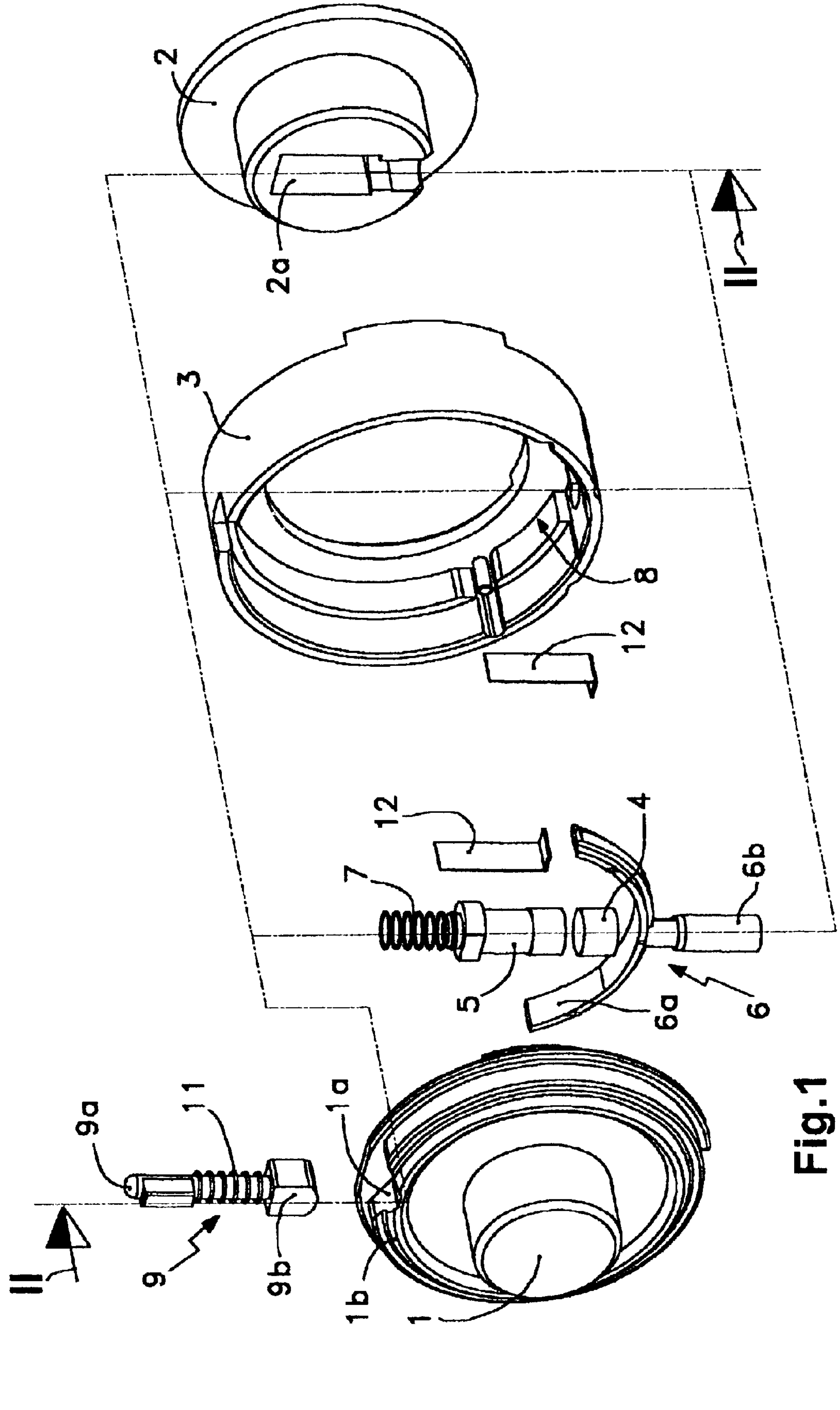
FIG. 1 is an exploded view and in perspective of the proposed mechanism, seen from the side of the interior axis (1) and corresponding to a form of embodiment in which the rotational coupling of the interior (1) and exterior (2) axes is produced by the catch (5).

In these figures the following references are indicated:

1—Interior axis
**1*a*—Recess of the interior axis (1)**
**1*b*—Peripheral annular track of the interior axis (1)**
2—Exterior axis
**2*a*—Housing in the exterior axis (2)**
3—Static body
4—Radial pin
5—Radial catch
6—Radial actuator
**6*a*—Curved plate of the radial actuator (6)**
**6*b*—Rod of the radial actuator (6)**
7—Radial compression spring
8—Annular depression between the interior axis (1) and static body (3)
9—Movable activator
**9*a*—End of the movable activator (9)**
**9*b*—Rounded head of the movable activator (9)**
10—Electric micro-switch
**10*a*—Actuator lever of the micro-switch (10)**
11—Spiral compression spring
12—Small plates

DETAILED DESCRIPTION OF THE INVENTION

With relation to the drawings and references enumerated above, a preferred mode of execution of the proposed clutch mechanism for locks is illustrated in the attached plans.

As shown in FIG. 1, this mechanism is composed of an interior axis (1), an exterior axis (2), a static body (3), a set of radial pin (4) and radial catch (5) and a radial actuator (6); in which: said interior axis (1), exterior axis (2) and static body (3) compose a coaxial assembly in which the exterior axis (2) penetrates with a rotational adjustment within the interior axis (1) when both the interior (1) and exterior (2) axes are installed with a rotational adjustment in the static body (3), said set of radial pin (4) and radial catch (5) is installed with a movable adjustment between said actuator (6) which is in contact with the radial pin (4) and a radial compression spring (7) which acts between the radial catch (5) and the base of a housing **(2*a*) of the exterior axis (2), whose radial pin (4) and radial catch (5) are dimensioned in combination so that, in an exclusive manner, one or the other is able to remain within the circumference of the exterior diameter of the exterior axis (2) and the circumference of the interior diameter of the interior axis (1), and said radial actuator (6) is composed of a curved plate (6*a*) and by at least one rod (6*b*), whose curved plate (6*a*) is located in an annular depression (8) defined between said interior axis (1) and static body (3), where this curved plate (6*a*) extends in a circumferential arc which contains the angular sector corresponding to the operative rotational transit of said interior axis (1) to either side of a central position, and whose rod (6*b*) of the radial actuator (6) is installed with a movable adjustment in said static body (3) and, when it is the only one, this rod (6*b*) is in the center of said curved plate (6*a*) and is aligned with said radial pin (4) and radial catch (5)** in said resting position.

This same FIG. 1 refers to a preferred form of embodiment such that in said set of radial pin (4) and catch (5), said radial pin (4) is adjusted by moving in the interior axis (1) and has a length equal to the thickness of this interior axis (1), while said radial catch (5) is adjusted by moving in the exterior axis (2) and, with said compression spring (7) in its state of maximum operative extension and in relation to said central resting position of the interior axis (1), this radial catch (5) has a length such that its end extends beyond the exterior diameter of the exterior axis (2) by a measure approximately equal to half the thickness of the interior axis (1) and equal to the operative radial course of said curved plate **(6*a*) in said annular depression (8)**.

Figure 2:
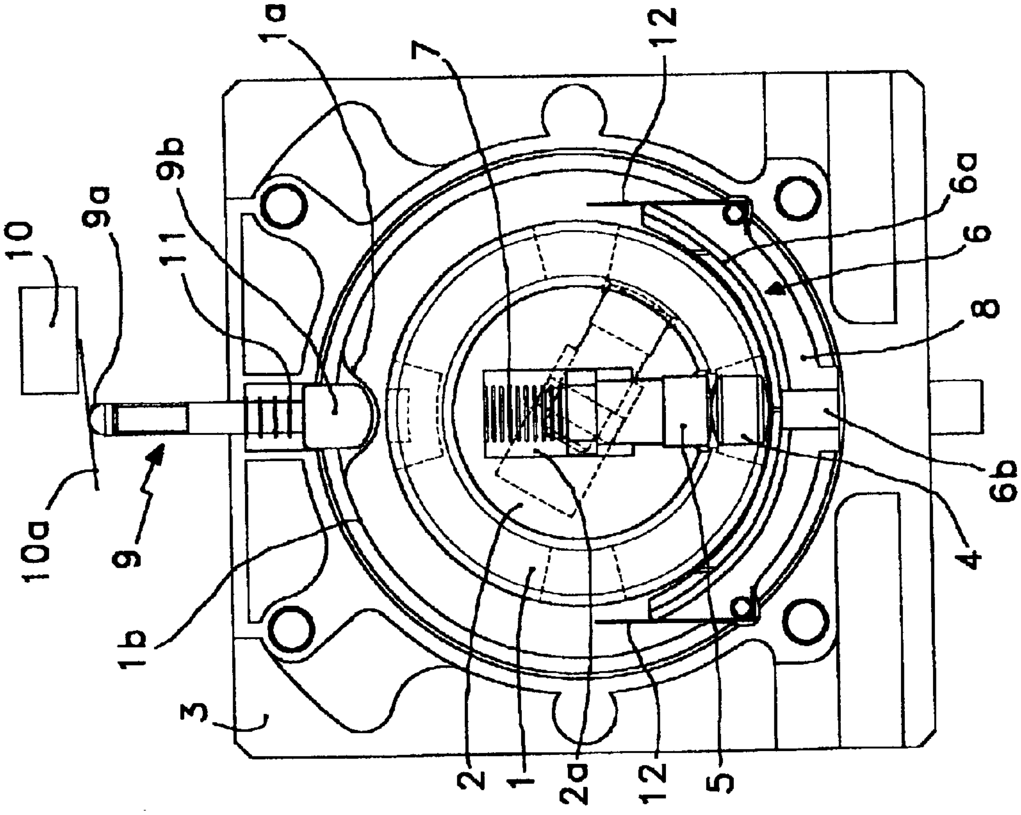
FIG. 2 is a view in orthogonal projection of the mechanism of FIG. 1, given from the side of the interior axis (1) and along a conventional section II—II by means of a cross section which passes just in front of the movable activator and, then, through the common axis (in the assembly of the whole) of the pin (4), of the catch (5), of the rod **(6*b*), of the radial spring (7) and of the housing (2*a*). In this figure the disengaged state of the mechanism is shown and the micro-switch (10) is schematically incorporated. The end positions of the operative transit of the pin (4) and the catch (5)** in one of the two possible directions are also shown in outline.
Figure 3:
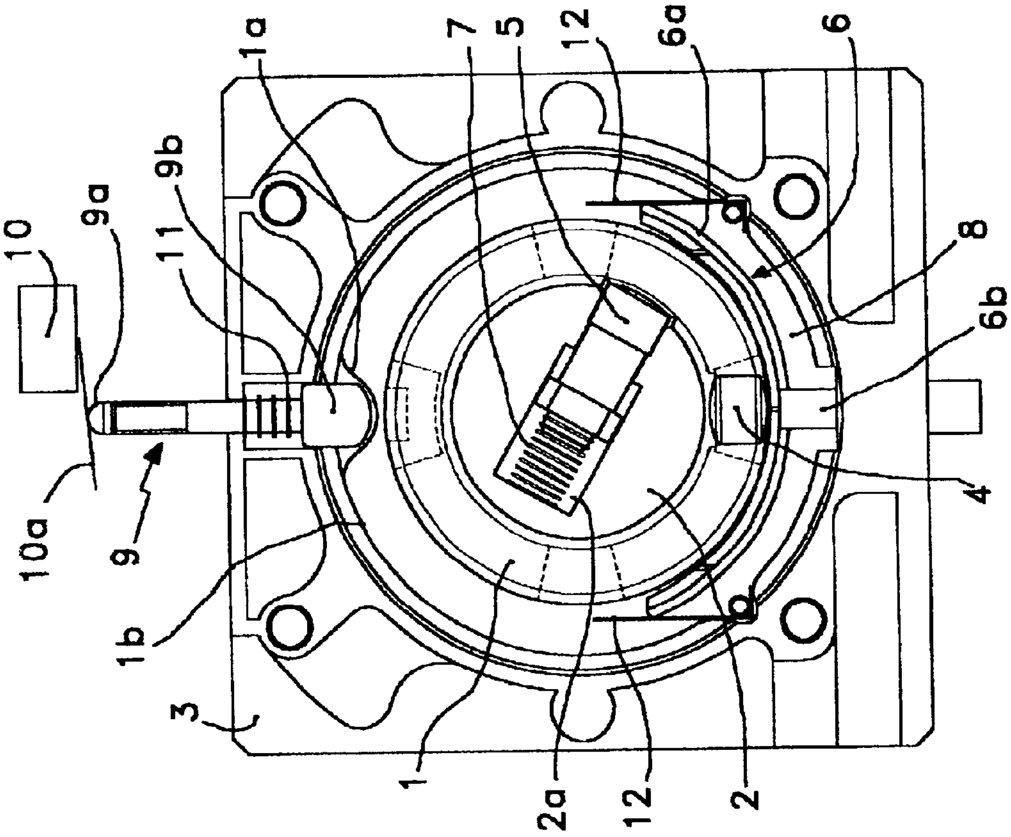
FIG. 3 is similar to FIG. 2, but showing the exterior axis (2) turned toward the end of its operative transit in one of the turning directions.

FIGS. 2 to 5 illustrate the whole assembly of the elements of the form of embodiment of FIG. 1, in various states and operative positions. FIG. 2 shows the initial resting position in which the mechanism is in a disengaged state and the interior (1) and exterior (2) axes can turn independently as can be seen in FIG. 3, where it is the exterior axis (2) which has turned without pulling the interior axis (1) along with it.

Figure 5:
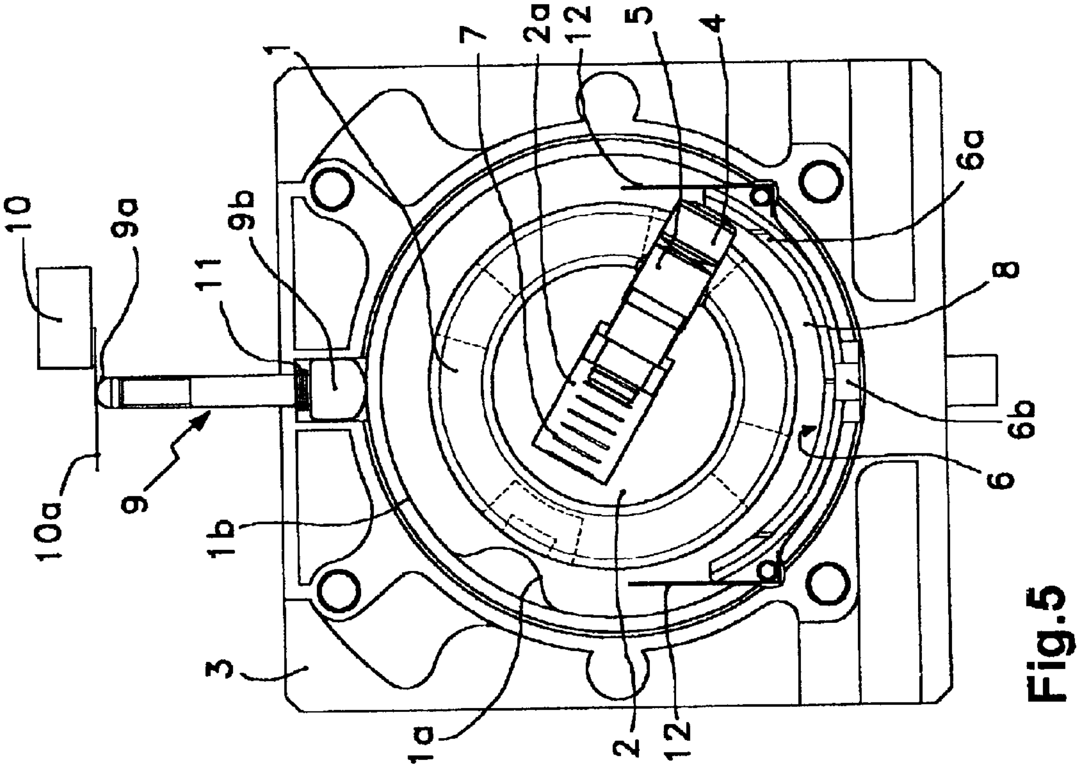
FIG. 5 is similar to FIG. 3, but corresponding to the engaged state of FIG. 4.

When by mechanical or electromechanical means the radial actuator (6) is displaced, the result is that the radial catch (5) is held (FIG. 4) in the middle of the rotational connection between the interior (1) and exterior (2) axes, in such a way that the latter pulls the former along with it as can be seen in FIG. 5.

Another characteristic of the invention is the existence of a movable activator (9) which is installed through the static body (3) and which, in relation to the rotational position of rest of said interior axis (1), this movable activator (9) is placed between a point (9*a*), which in the exterior of the static body (3) is in contact with the actuator lever (10*a*) of an electric micro-switch (10) in an operative position of the same, and a rounded head (9*b*) which rests against the base of a recess (1*a*) which is made in the interior axis (1) with lateral walls sloping divergently until they reach a peripheral annular track (1*b*) of the same interior axis (1), whose recess (1*a*) has a depth equivalent to the operative transit of said actuator lever (10*a*) of the micro-switch (10), and whose rounded head (9*b*) of the movable activator (9) has its back applied against one end of a spiral compression spring (11) which has its other end applied against the static body (3).

Figure 4:
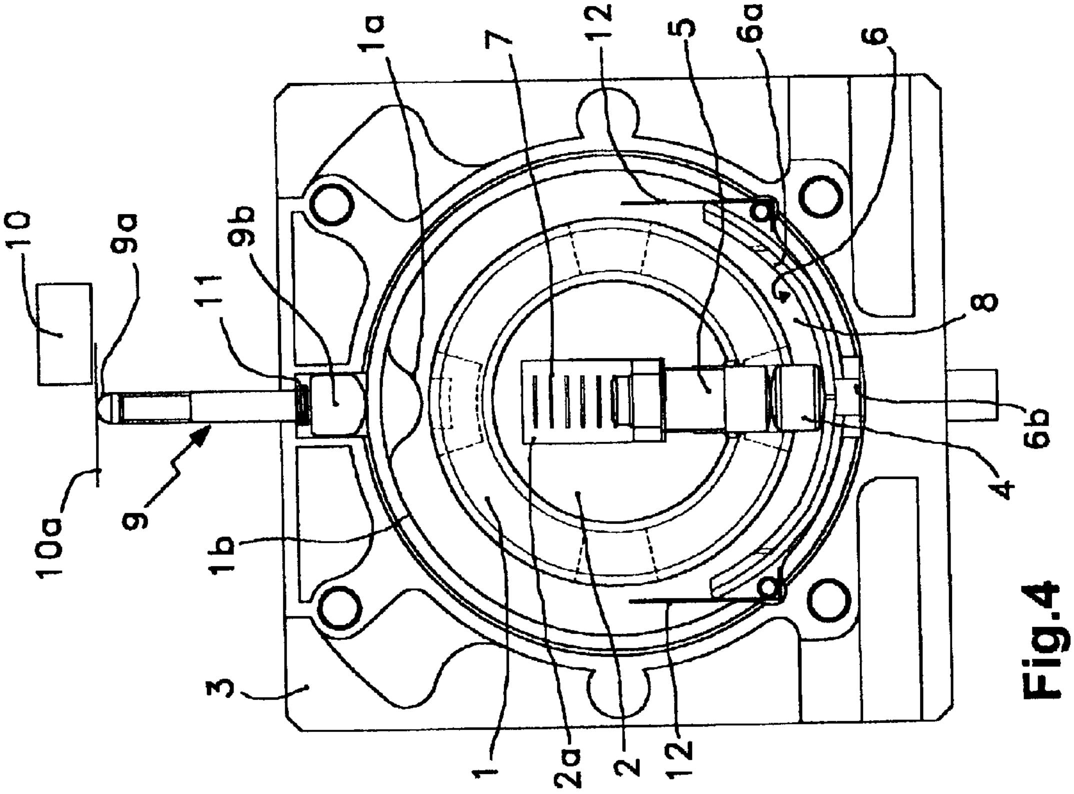
FIG. 4 is similar to FIG. 2, but in the engaged state.

The functionality of this device is clearly illustrated by means of the comparison of FIGS. 4 and 5, where it can be seen that, due to the special combined configuration of the recess (1*b*) and the rounded head (9*b*), as the interior axis (1) turns, it causes the extension of the movable activator (9), against the spiral spring (11), making the end (9*a*) move the lever (10*a*) of the micro-switch (10).

Another particular feature of the invention is that said static body incorporates a pair of small plates (12) which are parallel to the operative displacement of said curved plate (6*a*) of the radial actuator (6) and which more than cover the amplitude of this displacement, and which are each placed against one end of said curved plate (6*a*). This option is shown illustrated in FIGS. 6 to 8; particularly, the observation of FIGS. 7 and 8 illustrate the cooperative function of the small plates (12) in the guidance of the ends of the curved plate (6*a*), as well as in providing an additional resistance at those ends when the pin (4) comes to rest upon the same, as in FIG. 5.

Figure 6:
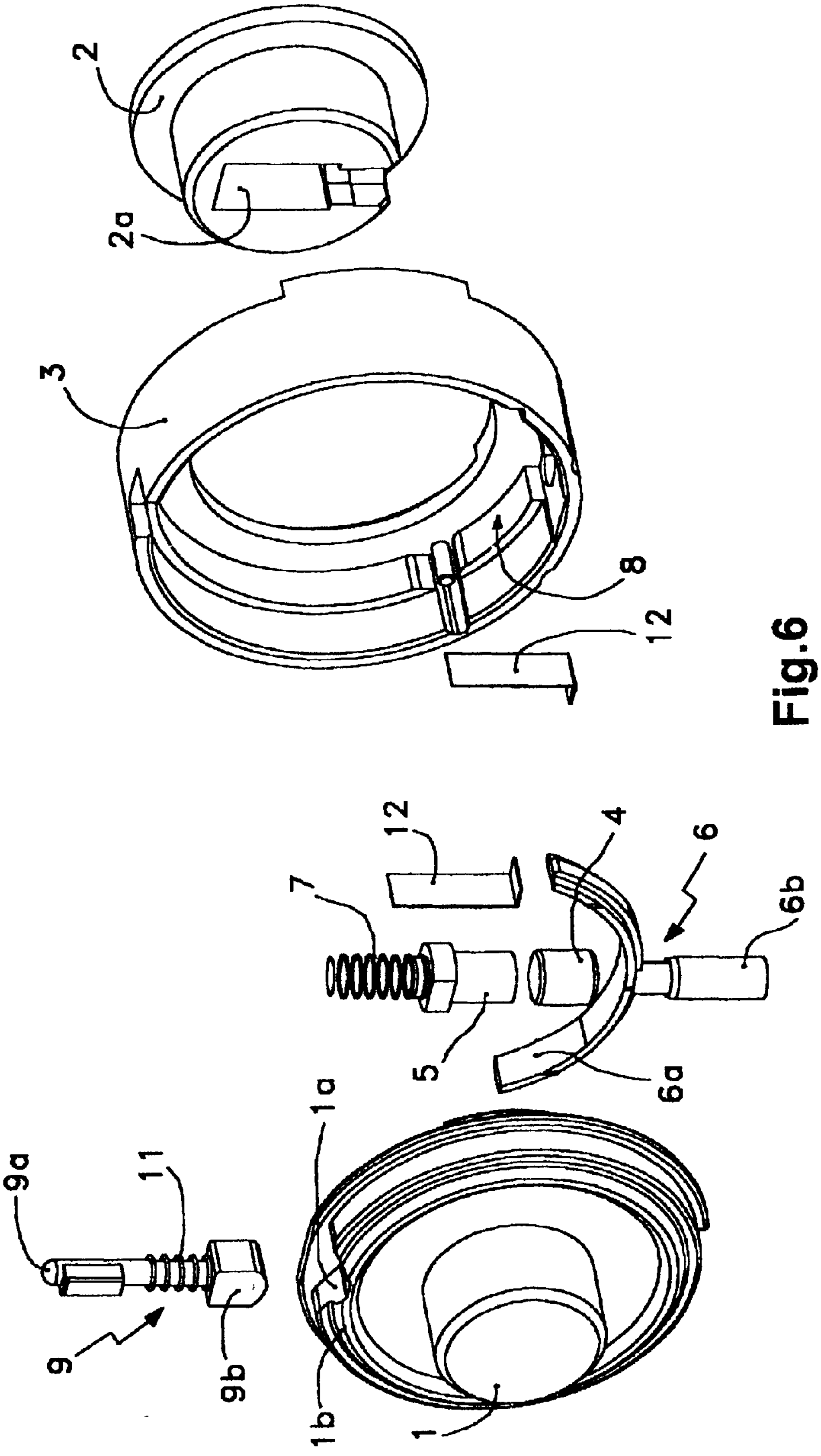
FIG. 6 is similar to FIG. 1, but corresponding to another form of embodiment in which the rotational coupling is produced by the pin (4).
Figure 8:
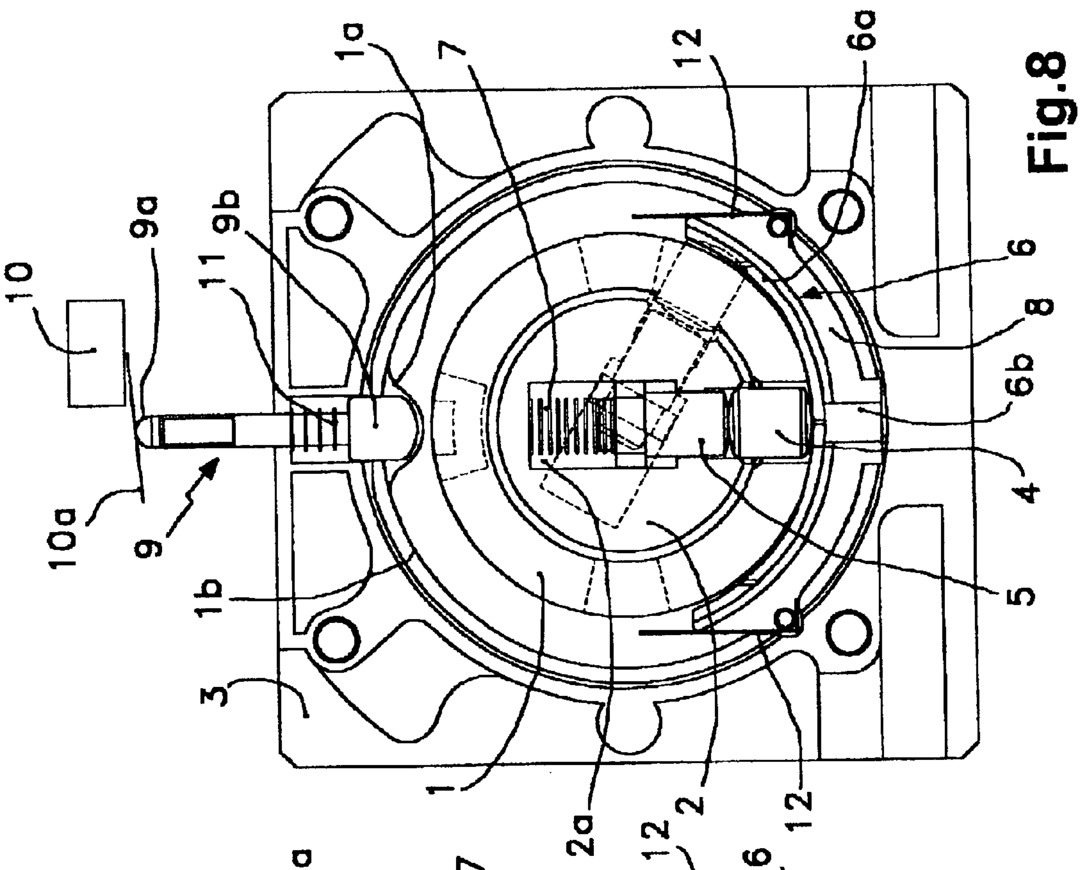
FIGS. 7 and 8 are respectively equivalent to FIGS. 2 and 4, but referring to the embodiment of FIG. 6.
Figure 7:
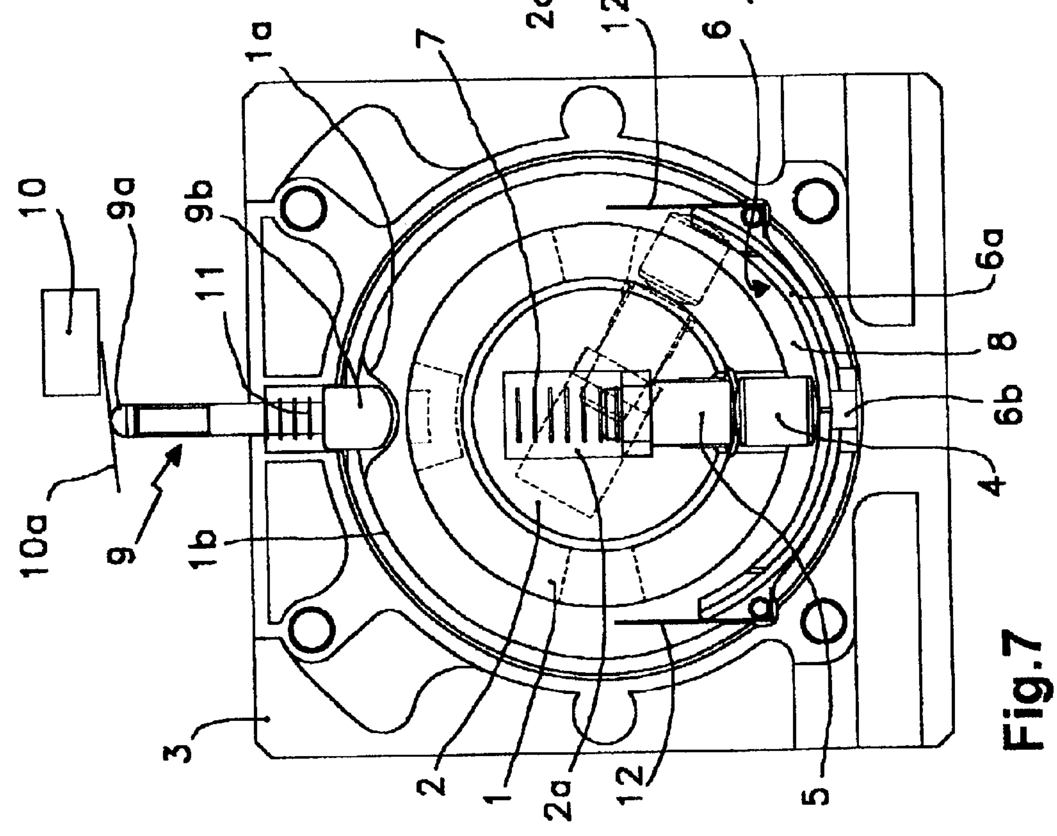

Another form of embodiment is that which, in light of the preceding, is illustrated by means of FIGS. 6 to 8 and is specified because, in said set of radial pin (4) and radial catch (5), said radial catch (5) is adjusted by moving in the exterior axis (2) and has a length such that, with said compression spring (7) in its state of maximum operative extension and in relation to said central resting position of the interior axis (1), this radial catch (5) has its end in the exterior diameter of the exterior axis (2), while said radial pin (4) is adjusted by moving in the interior axis (1) and has a length which exceeds the thickness of this interior axis (1) by a measure equal to the operative radial course of said curved piece (6*a*) in said annular depression (8). Now, the relationship between the lengths of the radial pin (4) and the radial catch (5) is such that, as shown in FIG. 8, the rotational coupling of the interior (1) and exterior (2) axes (engaged state) is produced by the radial pin (4). Observe that, now, the engaged state is with the curved plate (6*a*) set against the periphery of the interior axis (1); while in the previous embodiment this state is produced with said curved plate (6*a*) set against the static body (3) (FIG. 5).

Figure 9:
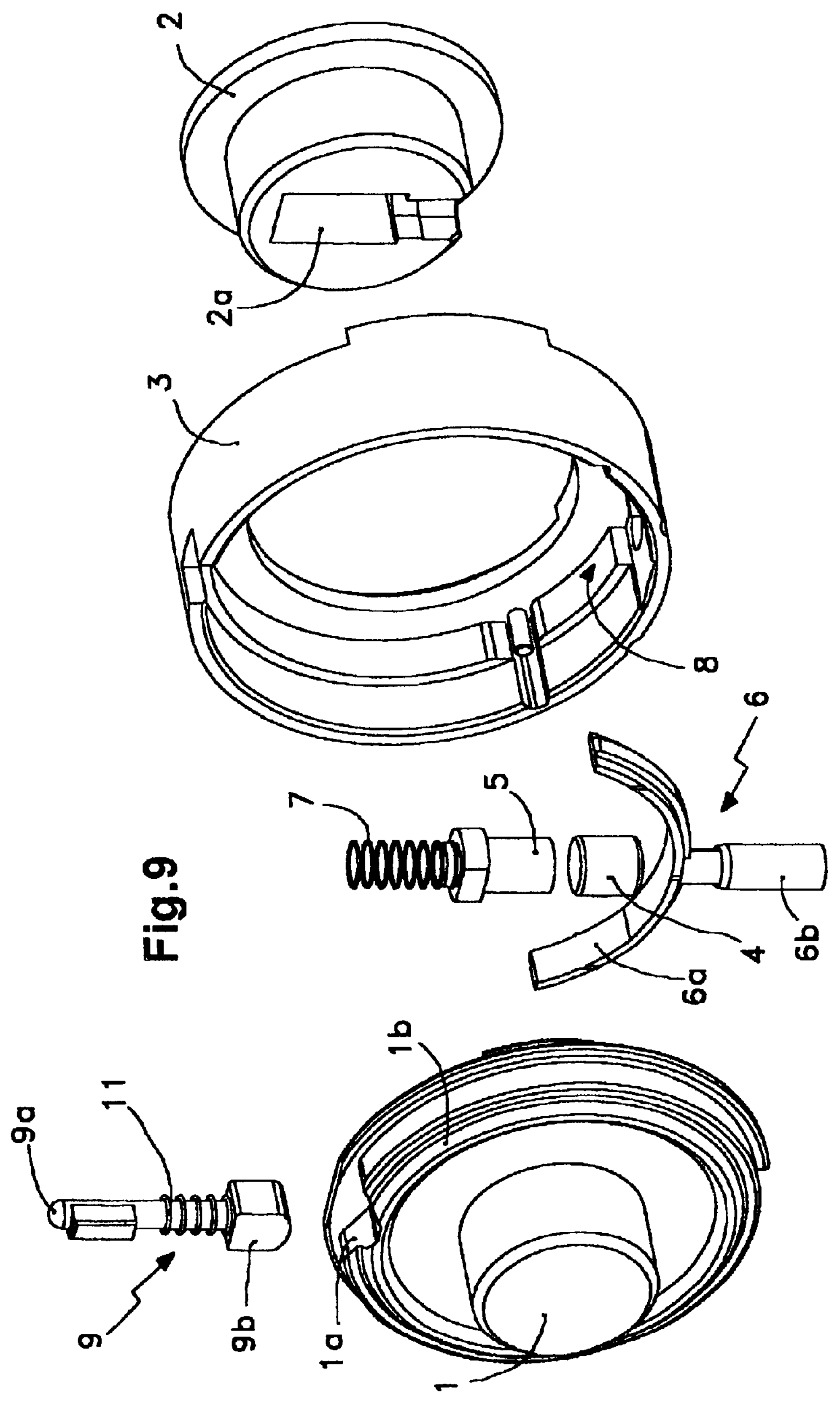
FIG. 9 is similar to FIG. 6, but corresponding to another form of embodiment in which the small plates (12) do not exist.
Figure 11:
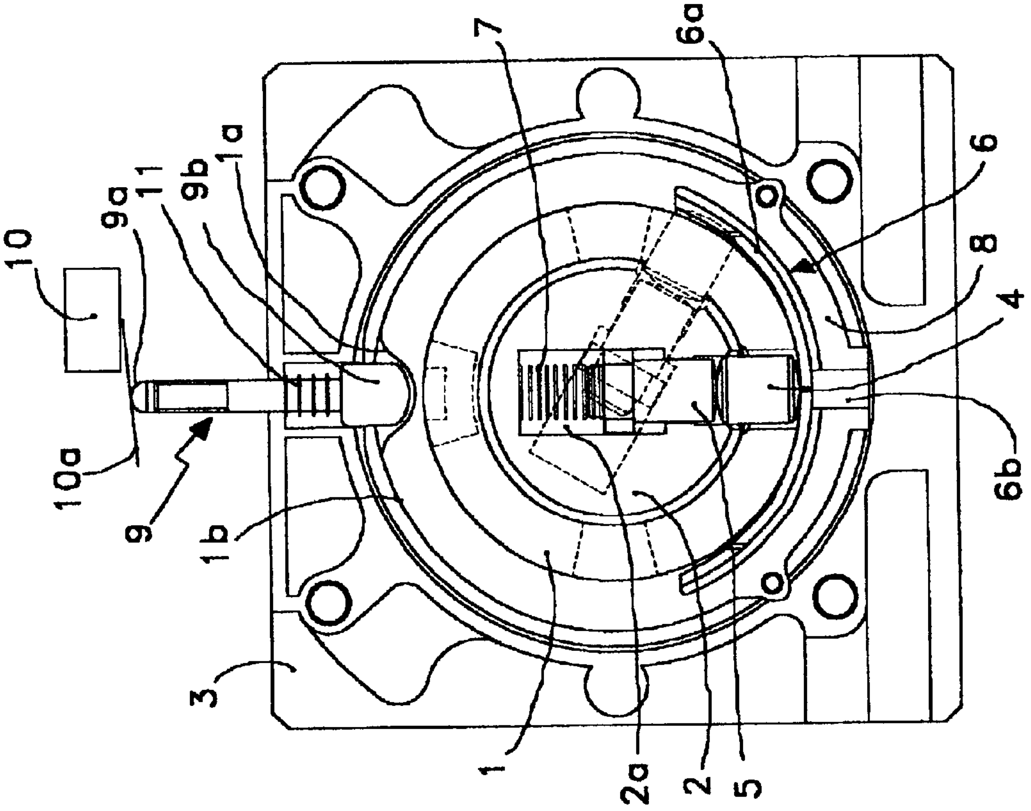
FIGS. 10 and 11 are respectively equivalent to FIGS. 7 and 8, but referring to the embodiment of FIG. 9.
Figure 10:
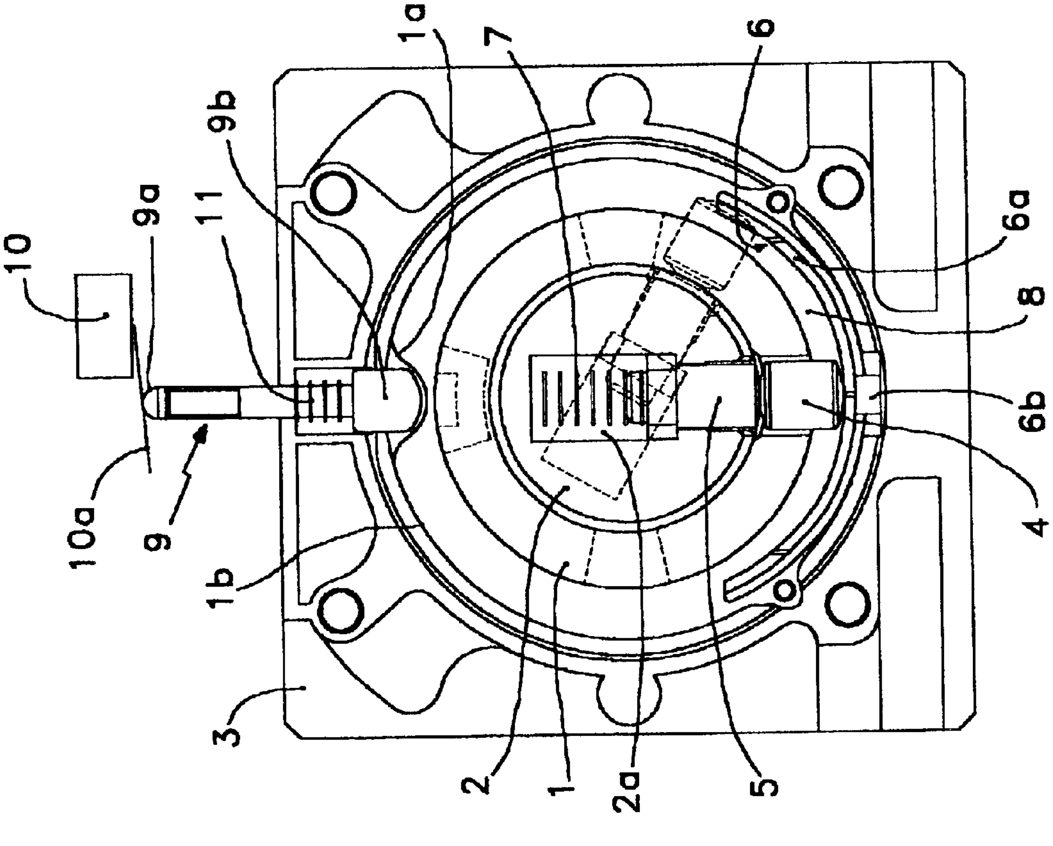

Another form of alternative embodiment is that which is illustrated in FIGS. 9 to 11, which is substantially identical to the preceding (FIGS. 6 to 8), with the single exception that, now, the small plates (12) have been omitted. Obviously, this omission of the small plates would also be possible in the first of the forms of embodiment illustrated in FIGS. 1 to 5.

What is claimed is:

1. A clutch mechanism for locks, characterized in that, in relation to the interior and exterior sides of a lock installed in a door, the mechanism is composed of an interior axis (1), an exterior axis (2), a static body (3), a set of a radial pin (4) and radial catch (5), and a radial actuator (6); in which: said interior axis (1), exterior axis (2) and static body (3) compose a coaxial assembly in which the exterior axis (2) penetrates with a rotational adjustment within the interior axis (1) when both the interior (1) and exterior (2) axes are installed with a rotational adjustment in the static body (3), said set of radial pin (4) and radial catch (5) is installed with a movable adjustment between one said actuator (6) which is in contact with the radial pin (4) and a radial compression spring (7) which acts between the radial catch (5) and the base of the housing (2*a*) of the exterior axis (2), whose radial pin (4) and radial catch (5) are dimensioned in combination so that, in an exclusive manner, one or the other is able to remain within the circumference of the exterior diameter of the exterior axis (2) and the circumference of the interior diameter of the interior axis (1), and said radial actuator (6) is composed of a curved plate (6*a*) and by at least one rod (6*b*), whose curved plate (6*a*) is located in an annular depression (8) defined between said interior axis (1) and static body (3), where this curved plate (6*a*) extends in a circumferential arc which contains the angular sector corresponding to the operative rotational transit of said interior axis (1) to either side of a central position, and whose rod (6*b*) of the radial actuator (6) is installed with a movable adjustment in said static body (3) and, when it is the only one, this rod (6*b*) is in the center of said curved plate (6*a*) and aligned with said radial pin (4) and radial catch (5) in said resting position.

2. The clutch mechanism for locks, according claim 1, further characterized in that in said set of radial pin (4) and radial catch (5), said radial pin (4) is adjusted by moving in the interior axis (1) and has a length equal to the thickness of this interior axis (1), while said radial catch (5) is adjusted by moving in the exterior axis (2) and, with said compression spring (7) in its state of maximum operative extension and in relation to a central resting position of the interior axis (1), this radial catch (5) has a length such that its end extends beyond the exterior diameter of the exterior axis (2) by a measure approximately equal to half the thickness of the interior axis (1) and equal to the operative radial course of said curved plate (6*a*) in said annular depression (8).

3. The clutch mechanism for locks according to claim 1, further characterized in that, in said set of radial pin (4) and radial catch (5), said radial catch (5) is adjusted by moving in the exterior axis (2) and has a length such that, with said compression spring (7) in its state of maximum operative extension and in relation to said central resting position of the interior axis (1), this radial catch (5) has its end in the exterior diameter of the exterior axis (2), while said radial pin (4) is adjusted by moving in the interior axis (1) and has a length which exceeds the thickness of this interior axis (1) by a measure equal to the operative radial course of said curved piece (6*a*) in said annular depression (8).

4. The clutch mechanism for locks according to claim 1, 2 or 3, further characterized in that there exists a movable activator (9) which is installed through the static body (3) and which, in relation to the rotational position of rest of said interior axis (1), this movable activator (9) is installed between a point (9*a*), which in the exterior of the static body (3) is in contact with the actuator lever (10*a*) of an electrical micro-switch (10) in an operative position of the same, and a rounded head (9*b*) which rests against the base of a recess (1*a*) which is made in the interior axis (1) with lateral walls sloping divergently until reaching a peripheral annular track (1*b*) of the same interior axis (1), whose recess (1*a*) has a depth equivalent to the operative transit of said actuator lever (10*a*) of the micro-switch (10), and whose rounded head (9*b*) of the movable activator (9) has its back set against one end of a spiral compression spring (11) which has its other end set against the static body (3).

5. The clutch mechanism for locks according to claim 1, 2 or 3, further characterized in that said static body (3) incorporates a pair of small plates (12) which are parallel to the operative displacement of said curved plate (6*a*) of the radial actuator (6) and which more than cover the amplitude of this displacement, and which are each placed against one end of said curved plate (6*a*).

6. The clutch mechanism for locks according to claim 4, further characterized in that said static body (3) incorporates a pair of small plates (12) which are parallel to the operative displacement of said curved plate (6*a*) of the radial actuator (6) and which more than cover the amplitude of this displacement, and which are each placed against one end of said curved plate (6*a*).

* * * * *